(12) United States Patent
Cornelissen et al.

(10) Patent No.: US 6,540,359 B1
(45) Date of Patent: *Apr. 1, 2003

(54) IMAGE PROJECTION SYSTEM

(75) Inventors: Hugo J. Cornelissen, Eindhoven (NL); Adrianus J. S. M. De Vaan, Eindhoven (NL)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,222

(22) Filed: Apr. 30, 1998

(30) Foreign Application Priority Data

May 7, 1997 (EP) .............................. 97201359

(51) Int. Cl.[7] ................................................ G03B 21/14
(52) U.S. Cl. ........................................ 353/20; 353/33
(58) Field of Search ............................... 353/30, 31, 33, 353/20; 348/744; 359/494; 349/58, 117

(56) References Cited

U.S. PATENT DOCUMENTS

| | | | | |
|---|---|---|---|---|
| 3,900,248 A | * | 8/1975 | Nagasaki | 349/117 |
| 5,042,925 A | * | 8/1991 | Broer | 359/37 |
| 5,130,826 A | | 7/1992 | Takanashi et al. | 359/40 |
| 5,184,248 A | * | 2/1993 | De Vaan | 359/483 |
| 5,239,322 A | * | 8/1993 | Takanashi et al. | 353/31 |
| 5,305,126 A | * | 4/1994 | Kobayashi et al. | 359/52 |
| 5,359,441 A | | 10/1994 | Mori et al. | 359/51 |
| 5,706,063 A | * | 1/1998 | Hong | 349/9 |
| 5,777,789 A | * | 7/1998 | Chiu | 353/33 |
| 5,786,934 A | * | 7/1998 | Chiu | 353/33 |
| 5,826,959 A | * | 10/1998 | Atsuchi | 353/20 |
| 5,833,338 A | * | 11/1998 | Barak | 353/20 |

FOREIGN PATENT DOCUMENTS

| | | | | |
|---|---|---|---|---|
| EP | | 0734184 | 9/1996 | H04N/9/31 |
| EP | | 734184 A3 | * 9/1996 | 353/31 |

OTHER PUBLICATIONS

Retardation Film for STN–LCDs "NRF" by the firm of Nitto Denko in SID '92 Exhibit Guide, Society for Information Display, May 17–22, 1992, Boston, Massachusetts, USA.

* cited by examiner

*Primary Examiner*—William Dowling
(74) *Attorney, Agent, or Firm*—Ernestine C. Bartlett

(57) ABSTRACT

The present invention relates to an image projection system (1). The system (1) comprises an illumination system (3) with a light source (5) for supplying an illumination beam. The system (1) also comprises a modulation system (11) with at least one reflecting image display panel (13, 15, 17) for modulating this light beam in conformity with image information to be projected, and a projection lens system (12) for projecting this image information. A color-separating system (19) is arranged between the modulation system (11) and the illumination system (3), and a polarizing beam splitter (9) is arranged between the color-separating system (19) and the illumination system. The reflective display panel is a liquid crystalline display panel of the diffusing type, and a λ/4 plate (35, 37, 39) is arranged between the reflective portions of the pixels of the display panel and the polarizing beam splitter.

5 Claims, 2 Drawing Sheets

IMAGE PROJECTION SYSTEM

BACKGROUND OF THE INVENTION

The invention relates to an image projection system comprising an illumination system with a light source for supplying an illumination beam, a modulaton system with at least one reflecting image display panel for modulating this light beam in conformity with image information to be projected, and a projection lens system for projecting said image information, a color-separating system being arranged between the modulation system and the illumination system, and a polarizing beam splitter being arranged between the illumination system and the color-separating system.

An image projection system of the type described in the opening paragraph is known from, for example European patent application EP 0 734 184. The system described in this application comprises an illumination unit with a light source for supplying an illumination beam. This unpolarized illumination beam is incident on a polarizing beam splitter (PBS) which ensures that one of the two complementary linearly polarized beam components, for example the s-component, is removed from the light path. The remaining component, the p-component, is split up by a color-separating system into three sub-beams each having a different wavelength. Each sub-beam is incident on a suitable reflective display panel. The display panel used in this case is a liquid crystalline display panel operating on the basis of polarization rotation of incident light. The display panel is subdivided into pixels which, in conformity with the image to be projected, are energized or not energized. An energized pixel will rotate the direction of polarization of incident light, while an unenergized pixel will leave the direction of polarization unchanged. Moreover, a $\lambda/4$ plate is arranged between the projection lens and the polarizing beam splitter for reducing the amount of light reflected from the optical system to the screen. Light passing through the $\lambda/4$ plate goes to the lens where it is reflected and will pass through the $\lambda/4$ plate again. Since this light passes through the $\lambda/4$ plate twice, it will undergo a polarization rotation of 90° so that this light will be removed from the light path upon its arrival at the PBS.

A display panel as described hereinbefore is generally provided with a linear polarizer on the illumination side. A pixel which is unenergized will reflect incident light specularly without changing the direction of polarization. The reflected light is thus again passed by the polarizer. Such a pixel will be observed as a bright pixel. A pixel which is energized will change the direction of polarization upon specular reflection. Consequently, this light will no longer be passed by the polarizer. Such a pixel will thus be observed as a dark pixel.

A drawback of the image projection system described in said European patent application is that unwanted polarization rotation will occur in the color-separating system, causing a loss upon polarization separation in the PBS. As a result, the dark state will degrade and the contrast to be realized is limited.

OBJECTS AND SUMMARY OF THE INVENTION

It is an object of the present invention to provide an image projection system in which the above-mentioned drawback is obviated and a relatively high contrast is realized.

To this end, the image projection system according to the invention is characterized in that the reflective display panel is a liquid crystalline display panel of the diffusing type, and a $\lambda/4$ plate is arranged between the reflective portions of the pixels of the display panel and the polarizing beam splitter.

A $\lambda/4$ plate is to be understood to mean an element which converts a linearly polarized beam into a circularly polarized beam, or conversely. The $\lambda/4$ plate preferably has a broad band so that it is active in the full visible wavelength range. A broad-band $\lambda/4$ plate is a transparent element composed of, for example a plurality of layers and realizing such a phase shift in a beam at all wavelengths ($\lambda$) in the visible wavelength range that circularly polarized radiation is converted into linearly polarized radiation. Such a $\lambda/4$ plate is described in, for example the publication: "Retardation Film for STN-LCDs 'NRF'" by the firm of Nitto Denko in SID '92 Exhibit Guide, Society for Information Display, May 17–22, 1992, Boston, Mass., USA.

The proposal to use display panels of the diffusing type is based on the inventive idea that, save for a small fraction, the light is incident outside the acceptance angle of the projection lens due to the diffuse reflection which occurs on pixels in the diffusing state, and consequently such a pixel has a relatively good dark state. By combining a diffusing display panel with a $\lambda/4$ plate, the detrimental effect on the dark state due to the unwanted polarization rotation occurring in the color-separating system is reduced considerably, while the quality of the bright state is maintained.

In a liquid crystalline display panel, the pixels may be switched between the transparent and the diffuse state. If the display panel comprises, for example a PDLC (polymer dispersed liquid crystal), the pixel will be in the diffuse state if no voltage is applied across the relevant pixel, and in the transparent state if a voltage is applied across this pixel.

In the transparent state, incident polarized light will be specularly reflected on the reflecting portion of the relevant pixel of the display panel, whereas in the diffusing state the light will be diffusely reflected and also depolarized. Due to this reflection, the diffuse, depolarized light will reach the polarizing beam splitter where approximately one half will propagate towards the illumination system and the other half will propagate towards the projection lens system. Since the angular distribution of the light has been changed completely as a result of the diffusion, only a very small fraction will be incident within the acceptance angle of the projection lens so that the pixel will be observed in the dark state.

By arranging a $\lambda/4$ plate between the polarizing beam splitter and the reflecting portions of the pixels of the display panel, it is ensured that the direction of polarization of the specularly reflected light is rotated through 90°, while the $\lambda/4$ plate has no effect on the diffuse, depolarized light.

In this way, an improved dark state is realized, while maintaining the quality of the bright state. This means that a relatively high contrast can be realized.

A further advantage of this embodiment is that a compact configuration is possible because in this case no off-axis optical system is required for the diffusing display panel. In fact, since the on-going and the projected beam generally have the same direction of polarization when using a reflecting diffusing display panel, these beams are to be spatially separated. In the present invention, these beams are polarized and this requirement of spatial separation may be dispensed with so that the system can be made more compact.

Moreover, it is sufficient to use optical components in the system according to the invention, for which the requirement as regards stress-related birefringence is relatively lenient. In systems, in which the operation of display panels is based on polarization rotation of incident light, such as, for example TN-LCDs, the requirements imposed on the stresses allowed in the substrates are very severe because they have a detrimental influence on the direction of polarization. Optical components having a low stress-related birefringence are, however, relatively expensive.

A further embodiment of the image projection system according to the invention is characterized in that the λ/4 plate is arranged at an outer side of the display panel facing the illumination system.

The λ/4 plate may be arranged on the display panel but may be alternatively arranged in a separate position. The linearly polarized light from the beam splitter will be converted by the λ/4 plate into circularly polarized light. In the case of specular reflection, which is the case with a transparent pixel, the circular direction of polarization will be inverted upon is reflection. Upon a second passage through the λ/4 plate, the circularly polarized light will be converted into linearly polarized light again. The direction of polarization of this light will be rotated through 90° with respect to the original light from the beam splitter. Consequently, upon arrival at the beam splitter, the reflected light will be passed by the beam splitter towards the projection lens system.

The diffusely reflected and depolarized light will be split up into two components at the beam splitter. One component will be sent towards the light source and only a very small fraction of the other component reaching the projection lens system will fit within the acceptance angle of the projection lens.

A preferred embodiment of the image projection system according to the invention is characterized in that the λ/4 plate is integrated in the display panel and is arranged between the layer of liquid crystalline material and the reflecting portions of the pixels.

The conversion from linearly polarized light to circularly polarized light is now effected within the display panel. This has the advantage that parasitic reflections on the substrate and the electrodes of the display panel can be suppressed. The parasitic reflections on the substrate and the electrodes have the same direction of polarization as the incident light from the light source and will consequently be sent towards the light source by the PBS so that the dark state will not be degraded by these reflections.

A further embodiment of the image projection system according to the invention is characterized in that a polarization conversion system is arranged between the light source and the polarizing beam splitter.

Consequently, substantially all of the light supplied by the light source is converted into light having the same direction of polarization, rather than that approximately half the light supplied by the light source is deflected from the light path. The light output of the illumination system is thereby increased considerably.

A further embodiment of the image projection system according to the invention is characterized in that the illumination system comprises an integrator system.

The integrator system ensures that the beam supplied by the illumination system is a homogeneous light beam. Known embodiments of an integrator system are, for example an optically transparent bar, an optical tunnel with reflective walls or a combination of two lens plates.

These and other aspects of the invention are apparent from and will be elucidated with reference to the embodiments described hereinafter.

DESCRIPTION OF THE PREFERRED EMBODIMENTS

Figure 1:
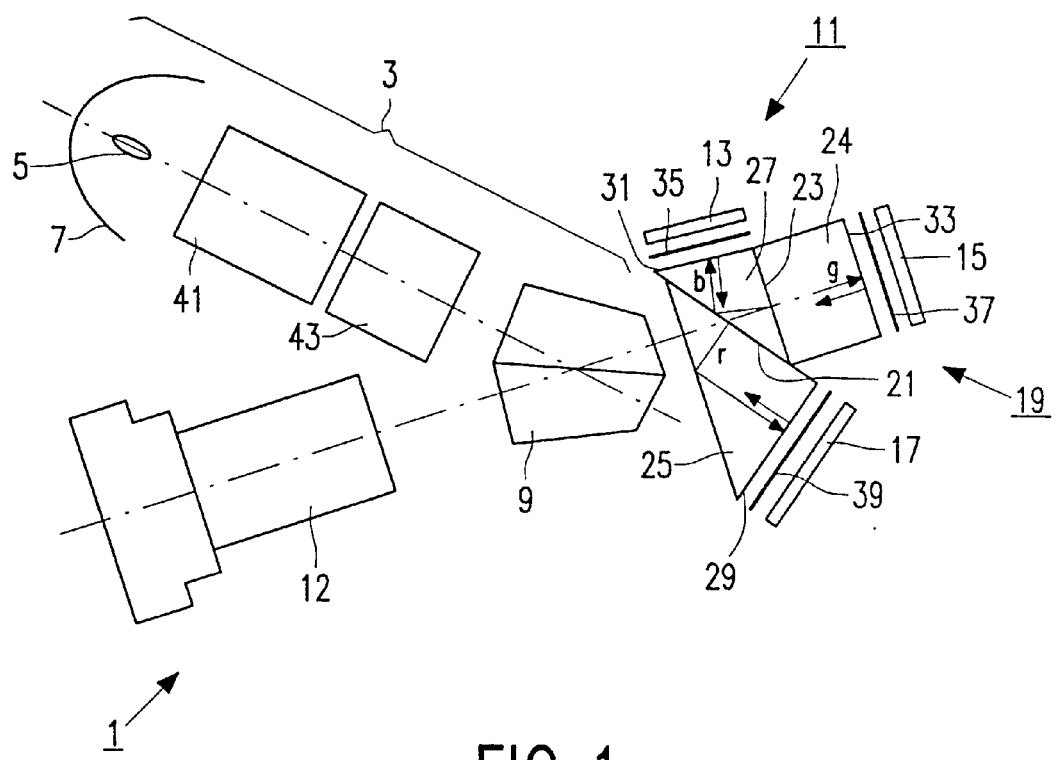
FIGS. 1 and 2 show a first and a second embodiment of an image projection system according to the invention, in which the beam splitter is implemented in different ways, so that a different configuration of the system is obtained.

FIG. 1 shows diagrammatically an image projection system 1 according to the invention. The image projection system 1 comprises an illumination system 3 which is provided with a light source 5 surrounded by a reflector 7. This reflector 7 ensures that the light emitted by the light source 5 comes in a direction away from the system and as yet reaches the system. The reflector 7 may be, for example a spherical or parabolic reflector. The light emitted by the light source 5 is unpolarized light. This light may be directly incident on a polarizing beam splitter 9 which will split up the unpolarized light into two linearly polarized sub-beams, for example an s-component and a p-component. One of these two sub-beams will be reflected on the interface of the beam splitter towards a modulation system 11.

The beam splitter may be implemented, for example as described in United States patent U.S. Pat. No. 5,042,925. The beam splitter may be alternatively implemented as a reflective polarizing foil as described in, for example international patent application WO 97/01788. Such a foil is transparent in one direction of polarization and reflective in the complementary direction of polarization.

However, a polarization conversion system 41 is preferably arranged between the light source 5 and the beam splitter 9, which system ensures that substantially all the light supplied by the light source is converted into light having the same direction of polarization. In this way, the light output of the illumination system is increased considerably in that, instead of diffracting half the light beam from the light path, this half is converted into light having the suitable direction of polarization.

Such a polarization conversion system may be implemented in different ways. The polarization conversion system may consist of a combination of two prisms in which polarization separation occurs on their interface, while it is also possible to change the direction of polarization of the beam diffracted from the light path and diffract it again towards the original beam. The polarization conversion system may also comprise one or more plane-parallel plates which are situated at the Brewster angle in the light beam in such a way that the beam is split up into an s-polarized beam component and a p-polarized beam component. The direction of polarization of one of the two components is subsequently changed and added to the other component. The possibilities mentioned here are described in, for example United States patent U.S. Pat. No. 5,184,248 and WO 96/05534, both in the name of the applicant.

Figure 2:
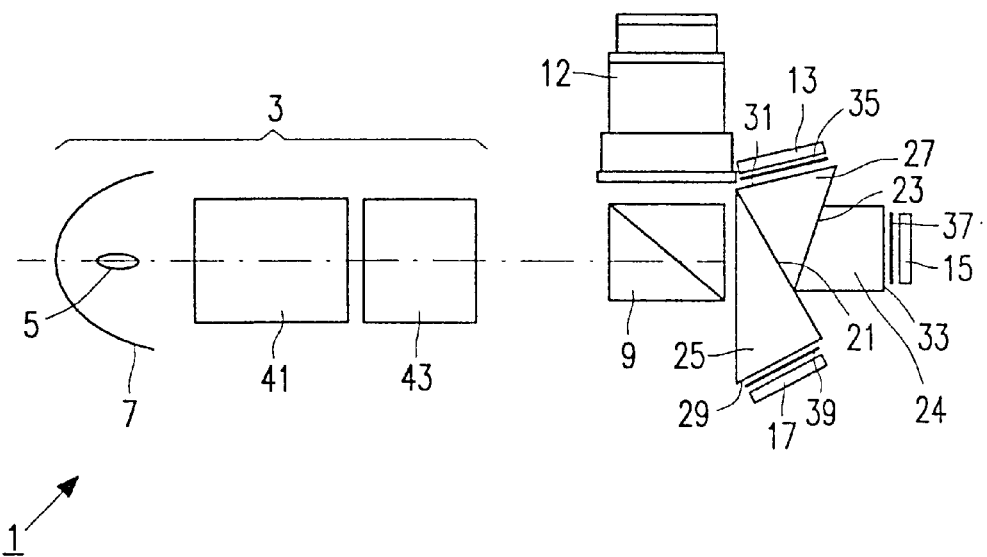

In FIGS. 1 and 2, the modulation system 11 comprises three reflective image display panels 13, 15, 17 which will ensure that the incident beam is modulated in conformity with the image information to be projected. Moreover, the system 1 comprises a projection lens system 12 for projecting the image thus formed on an image projection screen (not shown).

The pixels of a display panel consist of an active portion which actually switches and a passive portion which comprises, inter alia, the electronic components. A reflecting element is present under the liquid crystalline material of the active portion of a pixel in a reflective display panel. The display panels are of the diffusing type in which the pixels of the display panel can be switched between the transparent and the diffusing state. An example of such a panel is a PDLC (polymer dispersed liquid crystal display) panel. In a PDLC panel, the diffusing state corresponds to the dark state of the pixel, whereas the transparent state corresponds to the bright state.

A color-separating system 19 is arranged between the modulation system 11 and the polarizing beam splitter 9. In FIGS. 1 and 2, the color-separating system is constituted by a prism system comprising three prisms 24, 25, 27 having side faces with a dichroic coating. A "white" polarized beam is incident on the prism system 19. Surface 21 reflects, for example the red beam component and passes the blue and green beam components. Surface 23 reflects the blue beam component and passes the remaining green beam component. The red and blue beam components undergo internal reflection on the respective prisms and leave the prism system via the surfaces 29 and 31, respectively. The green component leaves the prism system via the surface 33. The sequence in which the different sub-beams in the prism system are separated from each other may of course be changed.

The sub-beams realized by the color-separating system are subsequently incident on a display panel 13, 15, 17 suitable for the wavelength of the sub-beam. A $\lambda/4$ plate 35, 37, 39 is arranged between each display panel and the relevant exit face of the prism system. In FIG. 1, the $\lambda/4$ plates are separate from the display panel. The $\lambda/4$ plates may also be provided on the display panel. Another possibility is to integrate the $\lambda/4$ plates in the display panel. This will be further described in detail.

Instead of three display panels, one for each primary color, the color image projection system may alternatively comprise a single color display panel which is provided with a color filter pattern which then has the function of a color-separating system. The color filter pattern may be a pattern of color absorption filters or a pattern of dichroic mirrors. In these two cases, the $\lambda/4$ plate is arranged between the beam splitter and the color-separating system.

The reflective display panel of the diffusing type as mentioned hereinbefore operates as follows. A linearly polarized beam which will be reflected on the pixels is incident on the display panel. An incident beam will be specularly reflected on a pixel which is in a transparent state, i.e. a voltage is applied across the pixel in a PDLC panel. When the incident beam is first incident on the $\lambda/4$ plate, this linearly polarized beam will be converted into a circularly polarized beam. Due to the specular reflection, the circular direction of polarization will be inverted. This beam, which has an inverted direction of polarization, passes through the $\lambda/4$ plate again and will thus be converted into a linearly polarized beam. The linear direction of polarization will be complementary, in other words, it will be rotated through an angle of 90° with respect to the beam from the beam splitter. When the reflected beam subsequently reaches the polarizing beam splitter 9, this beam will be passed by the beam splitter towards the projection lens system 12.

In the diffusing state of a pixel, incident circularly polarized light will be diffusely reflected and depolarized. The presence of the $\lambda/4$ plate does not have any further influence on this light. It remains unpolarized. The diffuse, depolarized light will also reach the PBS where it will pass approximately half of the light towards the illumination system, while the other half will propagate towards the projection lens system. Since the angular distribution of the light is completely changed due to the diffusion, only a very small fraction will be incident within the acceptance angle of the projection lens so that diffusing pixels will be observed in the dark state.

FIG. 2 shows diagrammatically an image projection screen according to the invention, in which a different type of beam splitter 9 is used. This results in a different configuration of the system, but the operating principle remains the same. For the transparent pixels, the light beams which come from the display panels and must give rise to bright image portions are sent towards the projection lens system. For the diffusing pixels, one part of the reflected light beam is sent towards the light source and another part is sent to the projection lens system, with the acceptance angle of the projection lens allowing only a very small fraction to reach the image.

The illumination system may further comprise an integrator system 43. This system ensures that the illumination system supplies a homogeneous illumination beam. Known embodiments of integrator systems are an optically transparent bar, an optical tunnel with reflective inner walls or a combination of two lens plates.

As already mentioned, the $\lambda/4$ plate may be arranged in the display panel, for example, between the reflecting portions of the pixels and the liquid crystalline layer, instead of on the display panel. This has the advantage that parasitic reflections coming from the electrodes and the upper substrate do not reach the screen but reach the light source because these reflections have the same direction of polarization as the incident light.

Figure 3:
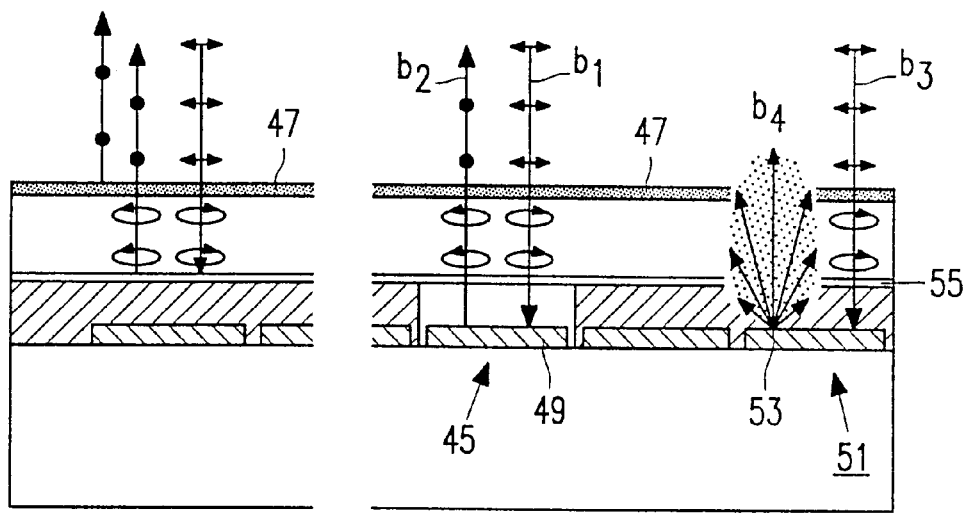
FIG. 3 shows an embodiment of an image display panel for use in an image projection system according to the invention, in which the λ/4 plate is present on the display panel.
Figure 4:
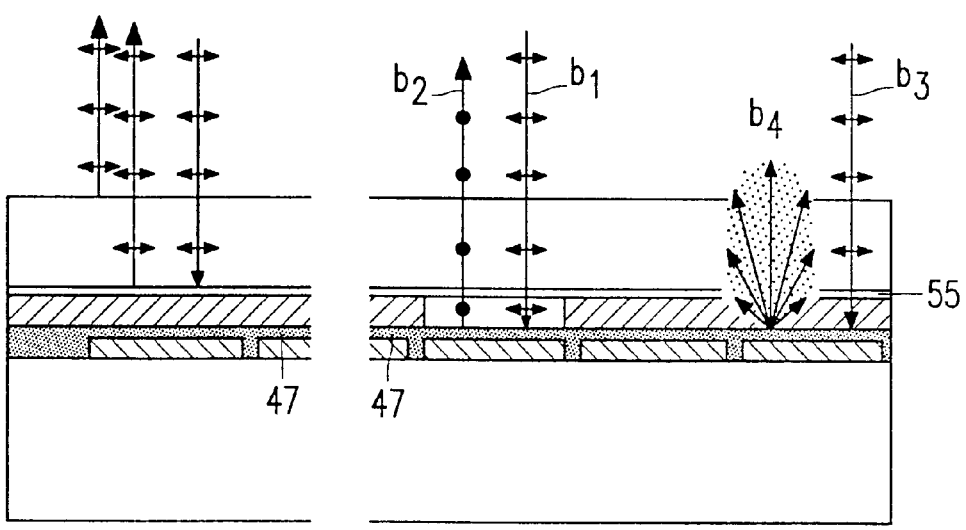
FIG. 4 shows an embodiment of an image display panel for use in an image projection system according to the invention, in which the λ/4 plate is present within the display panel.

FIGS. 3 and 4 illustrate the different possible positions of the $\lambda/4$ plate for a diffusing pixel and a transparent pixel. Parasitic reflections are shown at the extreme left in both Figures.

In FIG. 3, a linearly polarized light beam b is incident on a transparent pixel 45. The linearly polarized beam is converted by the $\lambda/4$ plate 47 into a circularly polarized beam. The circularly polarized beam reaches the reflecting portion 49 of the pixel 45 where its direction of polarization will be inverted as a result of the specular reflection. The circularly polarized beam is converted again into a linearly polarized beam $b_2$ by the $\lambda/4$ plate 47. This linearly polarized beam $b_2$ will now have a direction of polarization which is rotated through 90° with respect to that of the incident beam $b_1$. When the original beam $b_1$ is passed by the beam splitter, the beam $b_2$ reflected by the display panel will be diffracted in the beam splitter towards the projection lens system. If the beam $b_1$ is diffracted at the beam splitter, then the beam $b_2$ will be passed. Diffraction or passing in a given direction is determined by the embodiment of the beam splitter.

A light beam $b_3$ which is incident on a diffusing pixel 51 is also converted again into a circularly polarized beam by the $\lambda/4$ plate. However, this beam is diffused in the liquid crystalline layer and depolarized, and subsequently reflected on the reflective portion 53 of the pixel 51. The $\lambda/4$ plate 47 will have no influence on the directions of polarization present in this beam. When this unpolarized beam is incident on the beam splitter, approximately one half will be diffracted towards the projection lens system and the other half will be passed towards the light source. However, only a very small fraction of the portion reaching the projection lens system will be incident within the acceptance angle of the projection lens so that such light beams will not degrade the dark state.

The extreme left part in FIG. 3 illustrates that reflection on an electrode 55 may give rise to unwanted contributions in the image. The direction of polarization of the circularly polarized light converted by the $\lambda/4$ plate is inverted on the electrode and will consequently have a linear direction of polarization which corresponds to light coming from a transparent pixel, whereas the actual pixel is diffusing. Consequently, parasitic reflections will be produced so that the dark state is not optimal. This problem is solved by integrating the $\lambda/4$ plate 47 in the display panel, as is shown in FIG. 4. The light incident on the electrode is still linearly polarized. The direction of polarization is not influenced by specular reflection. For the direction of polarization of the reflected beams which come from the transparent and diffusing pixels, this different position of the $\lambda/4$ plate does not make any difference. However, for the reflections on the electrode 55, this does make a difference. In this case, the light which is reflected on the electrode 55 will have the same direction of polarization as the light incident thereon and the complementary direction of polarization of light beams reflected on transparent pixels. This means that the light beams reflected on the electrode will be sent towards the light source at the beam splitter instead of towards the projection lens system, as was the case in FIG. 3. Consequently, parasitic reflections are prevented from giving rise to degradation of the dark state.

What is claimed is:

1. An image projection system comprising an illumination system with a light source for supplying an illumination beam, a modulation system with at least one reflecting image display panel for modulating this light beam in conformity with image information to be projected, the display panel having a layer of liquid crystalline material and having pixels with reflective portions, and a projection lens system for projecting said image information, a color-separating prism being arranged between the modulation system and the illumination system, and a polarizing beam splitter being arranged between the illumination system and the color-separating system, characterized in that the reflective display panel is a liquid crystalline display panel having pixels which can be switched between a transparent state and a diffusing state, and a $\lambda/4$ plate is arranged between the reflective portions of the pixels of the display panel and the polarizing beam splitter.

2. An image projection system as claimed in claim 1, characterized in that the $\lambda/4$ plate is arranged at an outer side of the display panel facing the illumination system.

3. An image projection system as claimed in claim 1, characterized in that the $\lambda/4$ plate is integrated in the display panel and is arranged between the layer of liquid crystalline material and the reflective portions of the pixels.

4. An image projection system as claimed in claim 1, characterized in that a polarization conversion system is arranged between the light source and the polarizing beam splitter.

5. An image projection system as claimed in claim 1, characterized in that the illumination system comprises an integrator system.

* * * * *